(12) United States Patent
Matsunaga et al.

(10) Patent No.: US 11,074,817 B2
(45) Date of Patent: Jul. 27, 2021

(54) DRIVING SUPPORT APPARATUS

(71) Applicants: DENSO CORPORATION, Kariya (JP); TOYOTA JIDOSHA KABUSHIKI KAISHA, Toyota (JP)

(72) Inventors: Shogo Matsunaga, Kariya (JP); Masayasu Tanase, Nisshin (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 16/117,517

(22) Filed: Aug. 30, 2018

(65) Prior Publication Data

US 2019/0073906 A1 Mar. 7, 2019

(30) Foreign Application Priority Data

Sep. 1, 2017 (JP) .............................. JP2017-168407

(51) Int. Cl.
| | |
|---|---|
| *G08G 1/16* | (2006.01) |
| *B60W 30/095* | (2012.01) |
| *B60W 50/00* | (2006.01) |
| *B60W 30/09* | (2012.01) |
| *B60W 50/14* | (2020.01) |

(52) U.S. Cl.
CPC .............. *G08G 1/166* (2013.01); *B60W 30/09* (2013.01); *B60W 30/0953* (2013.01); *B60W 30/0956* (2013.01); *B60W 50/0097* (2013.01); *B60W 50/14* (2013.01); *B60W 2554/80* (2020.02); *B60W 2710/18* (2013.01)

(58) Field of Classification Search
CPC .. G08G 1/166; B60W 30/0956; B60W 30/09; B60W 50/14; B60W 50/0097; B60W 30/0953; B60W 2554/80; B60W 2710/18
See application file for complete search history.

(56) References Cited

U.S. PATENT DOCUMENTS

| | | | |
|---|---|---|---|
| 9,701,307 B1 * | 7/2017 | Newman | ............. B60W 10/184 |
| 10,259,454 B2 * | 4/2019 | Newman | ............... B60W 10/04 |

(Continued)

FOREIGN PATENT DOCUMENTS

| | | |
|---|---|---|
| DE | 102005025386 | 4/2006 |
| EP | 2287060 | 2/2011 |

(Continued)

*Primary Examiner* — Todd Melton
(74) *Attorney, Agent, or Firm* — Maschoff Brennan

(57) ABSTRACT

A driving support apparatus mounted on a vehicle, performing a driving support control includes: other vehicle determining unit that determines whether the other vehicle moves towards a present lane where the own vehicle runs from an adjacent lane; an acquiring unit that acquires a tip end lateral position of other vehicle in the present lane side, among lateral positions of the other vehicle in a direction perpendicular to a travelling direction of the own vehicle; an object determination unit that determines, based on a movement or a predicted movement of the tip end lateral position into the present lane from the adjacent lane, the other vehicle to be an object of a driving support control, and determining, based on no-movement of the tip end lateral position, the other vehicle not to be an object of a driving support control.

6 Claims, 4 Drawing Sheets

(56) References Cited

U.S. PATENT DOCUMENTS

| | | | | |
|---|---|---|---|---|
| 2005/0248445 | A1* | 11/2005 | Matsuoka | B60Q 9/008 340/435 |
| 2016/0362104 | A1* | 12/2016 | Miller | G07C 5/085 |
| 2017/0309182 | A1* | 10/2017 | Murray | G01S 13/931 |
| 2018/0033308 | A1* | 2/2018 | Litkouhi | B60W 30/00 |
| 2018/0111617 | A1* | 4/2018 | Stahl | B60W 30/16 |
| 2018/0297591 | A1* | 10/2018 | Minemura | B60W 30/08 |
| 2018/0345959 | A1* | 12/2018 | Fujii | B60W 30/0956 |
| 2018/0345960 | A1* | 12/2018 | Fujii | B62D 15/0255 |
| 2018/0345964 | A1* | 12/2018 | Fujii | B60Q 9/00 |
| 2018/0345978 | A1* | 12/2018 | Fujii | B62D 15/0265 |
| 2018/0346026 | A1* | 12/2018 | Fujii | B60W 30/18163 |
| 2018/0346027 | A1* | 12/2018 | Fujii | B62D 15/025 |
| 2018/0350242 | A1* | 12/2018 | Fujii | B62D 15/0255 |
| 2019/0251845 | A1* | 8/2019 | Kosaka | G06T 7/00 |

FOREIGN PATENT DOCUMENTS

| | | |
|---|---|---|
| JP | H09-223235 | 8/1997 |
| JP | 2002-148336 | 5/2002 |
| JP | 2003-016599 | 1/2003 |
| JP | 2005-145282 | 6/2005 |
| JP | 2011-196943 | 10/2011 |
| JP | 2017-117343 | 6/2017 |
| JP | 2018-067102 | 4/2018 |
| WO | WO 2018/074287 | 4/2018 |

* cited by examiner

EXAMPLE OF WITHOUT ACTIVATING DRIVING SUPPORT CONTROL

EXAMPLE OF ACTIVATING DRIVING SUPPORT CONTROL

– 1 –
DRIVING SUPPORT APPARATUS

CROSS-REFERENCE TO RELATED APPLICATION

This application is based on and claims the benefit of priority from earlier Japanese Patent Application No. 2017-168407 filed Sep. 1, 2017, the description of which is incorporated herein by reference.

BACKGROUND

Technical Field

The present disclosure relates to a driving support apparatus that performs driving support control with respect to a preceding vehicle running ahead of the own vehicle.

Description of Related Art

In recent years, a driving support apparatus mounted on a vehicle is becoming popular in order to avoid a collision with other vehicles which approach towards a travelling direction of the own vehicle from a lateral direction. As a driving support apparatus, for example, Japanese Patent Application Laid-Open Publication Number 2003-016599 discloses a technique that detects, based on a lateral distance between the own vehicle and other vehicle in the lateral direction, a situation where the other vehicle as a preceding vehicle with respect to the own vehicle interrupts ahead of the own vehicle.

Thus, the driving support apparatus according to the above-described patent literature determines, when an other vehicle approaches from a lateral direction towards a traffic lane where the own vehicle runs (i.e., present lane), whether the other vehicle moves in the present lane (cutting in) from an adjacent lane, based on a lateral distance to the other vehicle and a change in the lateral distance.

However, there is a concern that the driving support apparatus erroneously detects cutting in of the other vehicle even when the other vehicle does not cut in the present lane (i.e. there is no actual movement between lanes) after approaching the present lane from the adjacent lane, whereby an unnecessary alert may be issued or driving support such as automatic braking may be performed.

SUMMARY

The present disclosure has been achieved in light of the above-mentioned circumstances, and provides a driving support apparatus capable of reducing unnecessary driving support control.

An embodiment provides a driving support apparatus for a vehicle provided with an object detecting apparatus that detects an object in the surroundings of an own vehicle, the driving support apparatus performing a driving support control with respect to a preceding vehicle running ahead of the own vehicle based on detection information.

The driving support apparatus includes an other vehicle determination unit that determines whether or not a moving state is present in which an other vehicle in an adjacent lane adjacent to a present lane where the own vehicle runs moves towards the present lane; an acquiring unit that acquires, based on the detection information of the object detecting apparatus, a tip end lateral position of the other vehicle in a present lane side, among lateral positions of the other vehicle in a direction perpendicular to a travelling direction of the own vehicle; and an object determination unit, when the other vehicle determination unit determines that the moving state is present, determining based on a movement or a predicted movement of the tip end lateral position into the present lane from the adjacent lane, the other vehicle to be an object of a driving support control, and determining based on no-movement of the tip end lateral position into the present lane, the other vehicle not to be an object of a driving support control.

The driving support apparatus is configured to determine whether or not the other vehicle is an object of the driving support control, based on whether the other vehicle moves in the present lane from the adjacent lane. In this case, the tip end lateral position is monitored, thereby appropriately determining whether the other vehicle moving towards the present lane actually enters the present lane or stops the movement between lanes. Thus, in the case where the other vehicle approaches towards the present lane from the adjacent lane, but stays in the adjacent lane without moving between lanes (without cutting in), unnecessary alert or a driving support such as an automatic braking or the like can be suppressed.

DETAILED DESCRIPTION OF THE PREFERRED EMBODIMENTS

Hereinafter, with reference to the drawings, embodiments of the present disclosure will be described. In the following embodiments, the same reference numbers are applied to mutually identical or equivalent portions and redundant explanation will be omitted. A driving support apparatus according to the present embodiments is mounted on a vehicle (own vehicle), performing a driving support process based on information about an other vehicle 60 (preceding vehicle) existing near the own vehicle 50 such as in an area ahead of the own vehicle in the travelling direction thereof.

Figure 1:
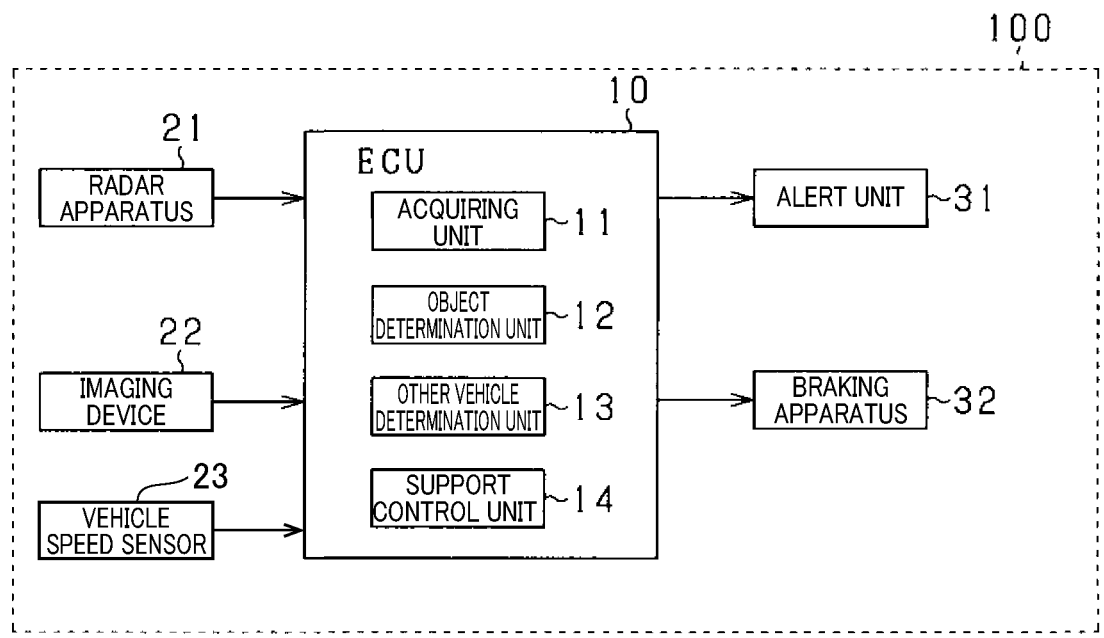
FIG. 1 is a block diagram showing a PCS system.

FIG. 1 exemplifies a block diagram showing a PCS (pre-crash-safety-system) system 100 used to avoid a collision with the other vehicle 60 or mitigate collision damage. The PCS system 100 is an example of a vehicle system mounted on the vehicle. The PCS system 100 detects objects (other vehicles and the like) existing around the own vehicle 50 and performs a collision avoidance operation of the own vehicle or a collision mitigation operation as a driving support control with respect to the object, when the own vehicle 50 may collide with the detected object.

The own vehicle 50 shown in FIG. 1 is provided with a radar apparatus 21, an imaging device 22, a vehicle speed sensor 23, ECU 10, an alert device 31 and a braking apparatus 32. In the embodiment shown in FIG. 1, the ECU 10 serves as a driving support apparatus. The radar apparatus 21 and the imaging device 22 serve as an object detecting apparatus.

The radar apparatus 21 is mounted on a front portion of the own vehicle 50 such that the optical axis thereof is oriented ahead of the own vehicle 50. The radar apparatus 21 detects an object ahead of the own vehicle 50 (i.e., front object) using electromagnetic waves (probing waves) such as millimeter waves or laser having directivity. The radar apparatus 21 probes, at a predetermined period using radar waves, a region spreading ahead of the own vehicle 50 in a predetermined range, and receives electromagnetic waves reflected at a surface of the front object, thereby acquiring a relative position of the front object, and a relative speed of the front object, as object information. Note that when the own vehicle 50 is defined as the origin, the relative position is acquired in a relative coordinate system where the X-axis is defined as a vehicle width direction of the own vehicle 50, and the Y-axis is defined as a travelling direction of the own vehicle 50. In terms of relative position, a component in the vehicle width direction (X-axis) refers to a lateral position of the object with respect to the own vehicle 50, and a component in the travelling direction (Y-axis) of the own vehicle 50 refers to a distance to the front object. The vehicle width direction can be referred to as a direction that intersects (orthogonal) the travelling direction of the own vehicle 50. The acquired object information (detected information) is transmitted to the ECU 10.

The imaging device 22 is an in-vehicle camera composed of a CCD camera, a CMOS image sensor, a near-infrared ray camera or the like, for example. The imaging device 22 is mounted to the own vehicle 50 at a center portion in the vehicle width direction having a predetermined height (e.g., in the vicinity of the upper end portion of wind shield), and captures a perspective image of a region spreading ahead of the own vehicle in a predetermined range. The captured image (detected information) is transmitted to the ECU 10 at a predetermined period. Note that the imaging device 22 may be a single camera or a stereo camera.

The vehicle speed sensor 23 detects a travelling speed of the own vehicle 50 based on rotational speed of wheels. The detection result of the vehicle speed sensor 23 is transmitted to the ECU 10.

The alert device 31 alerts the driver that an object is present ahead of the own vehicle 50 in accordance with a control command from the ECU 10 (attracting driver's attention). The alert device 31 is configured of a speaker installed in a vehicle cabin and a display unit that displays an image, for example.

The braking apparatus 32 brakes the own vehicle 50. The braking apparatus 32 is activated when the probability of collision with the front object becomes high. Specifically, a braking force is controlled to be higher than the braking operation of the driver (i.e., braking assist function), or an automatic braking is applied when no braking operation is performed by the driver (automatic braking operation).

The ECU 10 is configured of a known-microprocessor provided with a CPU, various memory units (ROM, RAM) and the like, performing control on the own vehicle 50 by using a calculation program and control data stored in the memory units. The ECU 10 detects an object (e.g., other vehicles) based on information outputted by the radar apparatus 21 and captured image outputted by the imaging device 22, and performs a driving support control (e.g., PCS) controlling the alert device 31 and the braking apparatus 32.

Hereinafter, a driving support control performed by the ECU 10 will be described. The ECU 10 sets a predicted collision region where an object and the own vehicle 50 may be collided. For example, the predicted collision region is set based on a lateral speed Vx of the object for example, such that the larger the lateral speed Vx of the object, the more spreading in the vehicle width direction (X-axis). Note that the width of the predicted collision region in the vehicle width direction is set based on the width of the own vehicle 50. The ECU 10 calculates a collision prediction time (TTC: time to collision) to collision of the object with the own vehicle. Specifically, the ECU 10 calculates the TTC, based on the distance between the own vehicle 50 (intervehicle distance) and the object and the relative speed therebetween, by dividing the relative distance by the relative speed.

Then, the ECU 10 determines whether the lateral position of the object outputted from the radar apparatus 21 is in a predicted collision region. The ECU 10 activates each apparatus in accordance with the TTC which is separately calculated and activation timings of the alert device 31 and the braking apparatus 32, when the lateral position of the object is within the predicted collision region. Specifically, when the TTC is smaller than or equal to the activation timing of the alert device 31, the ECU 10 activates the speaker or the like to issue an alert to the driver. In the case where the TTC is smaller than or equal to the activation timing of the braking apparatus 32, the ECU 10 operates a braking control process in which an automatic braking is activated thereby reducing the travelling speed at the collision. Alternatively, each apparatus may be operated by using the intervehicle distance between other vehicle 60 and the own vehicle.

On the other hand, for an object detection based on the captured image, the ECU 10 acquires captured image (image data) from the imaging device 22 and determines, based on the captured image and dictionary information for identifying objects, type of objects existing ahead of the own vehicle. The dictionary information for identifying objects is prepared for each type of objects such as vehicle, motor cycle, pedestrian, obstacle on the road or the like, and stored in a memory in advance. As the dictionary information of the vehicle, at least a front pattern and a rear pattern are prepared. Further, the front and rear patterns may be provided for each of types of vehicle, such as an oversize vehicle, a standard vehicle, and a light vehicle. The ECU 10 performs pattern matching between the captured image and the dictionary information, thereby identifying the type of vehicle.

The ECU 10 acquires positional information of the object (including lateral width of the object) in the vehicle width direction (X-axis direction) with respect to the travelling direction of the own vehicle 50. Then, driving support control is performed based on the positional information and a predicted collision region of the object. For example, a control object of the driving support control may be selected in accordance with an overlapping ratio between the lateral width of the object and the predicted collision region.

It is possible that an other vehicle 60 existing ahead of the own vehicle 50 may enter the present lane S1 (i.e., movement between lanes). In this case, the process determines that the own vehicle 50 may collide with the other vehicle 60. Hence, an unnecessary driving support process may be performed.

Figure 2:
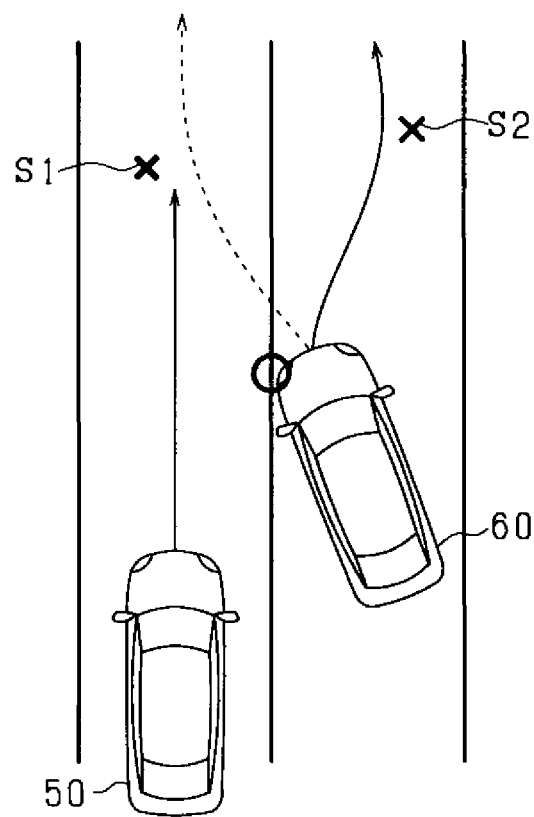
FIG. 2 is an explanatory diagram showing a cutting in by an other vehicle.

For example, as shown in FIG. 2, other vehicle 60 running on the right lane S2 which is adjacent to the present lane S1 may approach the present lane S1 where the own vehicle is running. In this case, when the other vehicle 60 approaches the present lane S1 from the right lane S2, the process possibly determines that the predicted collision region and the lateral width (lateral position) of the other vehicle 60 are overlapped. In this case, since the process predicts that collision may occur even when an interruption (movement between lanes) is discontinued after the other vehicle 60 approaches the present lane S1 from the right lane S2 so as to stay in the right lane S2, it is possible that unnecessary driving support (e.g., braking of vehicle) is performed. In other words, the process erroneously determines that the other vehicle 60 running on the right lane S2 cuts in the present lane S1 whereby unnecessary driving support may be performed.

Especially, in the case where the predicted collision region is set such that the larger the lateral speed Vx, the more it is spread in the vehicle width direction, unnecessary driving support is likely to be performed even when the other vehicle 60 stays in the adjacent lane.

Hence, according to the present embodiment, since unnecessary driving support is suppressed based on the other vehicle 60 performing no cutting in (movement between lanes), the process accurately determines whether cutting in to the present lane S1 is present. Hereinafter, configuration of the ECU 10 which appropriately performs the driving support, and processes execute by the ECU 10 will be described in detail.

As shown in FIG. 1, the ECU 10 can function as an acquiring unit 11 that acquires a travelling direction, a distance (relative distance), a travelling speed of the other vehicle 60. In more detail, the ECU 10 calculates the travelling speed of the other vehicle 60 based on the object information (lateral position, distance and relative speed) outputted by the radar apparatus 21 and the travelling speed of the own vehicle 50.

Note that the vertical speed Vy of the other vehicle 60 is calculated by adding the relative speed between the own vehicle 50 and the other vehicle 60 to the travelling speed of the own vehicle 50 acquired by the vehicle speed sensor 23. The lateral speed Vx of the other vehicle 60 is calculated using a change amount of the lateral position of the other vehicle 60 per unit of time. Then, the travelling speed V of the other vehicle 60 is calculated based on the vertical speed Vy and the lateral speed Vx of the other vehicle 60. At this time, based on the vertical speed Vy and the lateral speed Vx of the other vehicle 60, these speed components are combined, thereby calculating the travelling direction of the other vehicle 60 as well. In other words, the 1. ECU 10 calculates a velocity vector of the other vehicle 60. Then, the ECU 10 as the acquiring unit 11 acquires the travelling speed and the travelling direction of the object (other vehicle 60).

In the case where the other vehicle 60 existing ahead of the own vehicle 50 enters the present lane S1 (cutting in or the like), it is considered that the radar apparatus 21 or the imaging device 22 possibly detects a rear portion (e.g., rear end portion) of the other vehicle 60. This case may cause an inconvenient such as a delay of the driving support control.

Figure 3A:
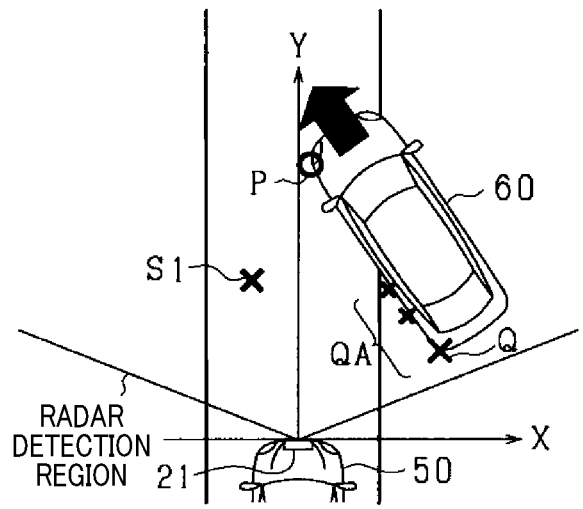
FIGS. 3A and 3B are diagrams each showing a lateral position of the other vehicle.
Figure 3B:
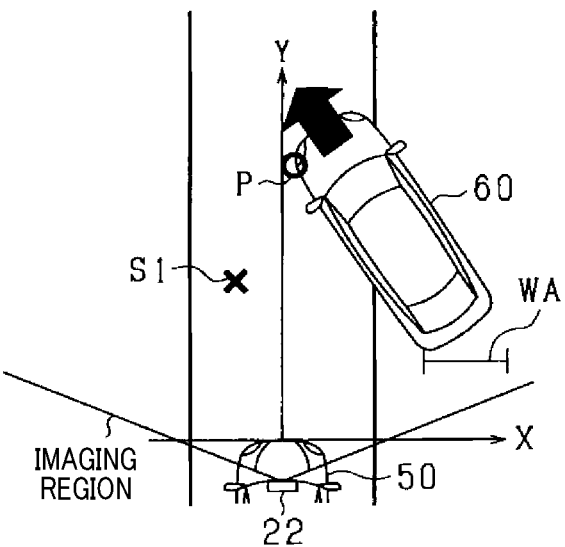

With reference to FIGS. 3A and 3B, it will be described in more detail. FIG. 3 is a circumstance in which the other vehicle 60 cuts in the present lane S1. In FIGS. 3A and 3B, the own vehicle 50 and the other vehicle 60 are present in the present lane S1, and the posture of the other vehicle 60 is inclined towards the lateral direction with respect to the present lane S1 (travelling direction of the own vehicle 50). Note that FIG. 3A illustrates a detection result of the other vehicle 60 by the radar apparatus 21, and FIG. 3B illustrates a detection result of the other vehicle which is detected by the imaging device 22.

In FIG. 3A, a position (lateral position and distance) of the other vehicle 60 is detected based on reflection points of probing waves emitted from the radar apparatus 21. Here, a plurality of detection points QA are detected in accordance with portions to be reflection points (detection points) of the probing waves, such as a rear side portion or an uneven region in the rear end portion of the other vehicle 60. Among the plurality of detection points QA, a representative point Q representing the other vehicle 60 is acquired. According to the present embodiment, a detection point having the highest reflection intensity is set as the representative point. Hence, according to the configuration, a detection point corresponding to the rear end portion of the other vehicle 60 is likely to be set as the representative point Q in FIG. 3A. In this case, since the lateral position P of the front end portion of the other vehicle 60 is closer to the own vehicle than the representative point Q (detection point QA) is, the driving support may be delayed.

On the other hand, as shown in FIG. 3B, the position of the object (other vehicle 60) is detected based on a result of the pattern matching of the captured image by the imaging device 22. In this configuration, by comparing the captured image and the dictionary information where the rear portion pattern of the vehicle is stored, a lateral width WA of the rear portion of the other vehicle 60 is detected. Then, the ECU 10 identifies the lateral position (e.g., end portion of the own vehicle 50 side) based on the lateral width WA. In this case, the lateral position P of the front end portion of the other vehicle 60 is closer to the own vehicle 50 than the lateral position identified using the lateral width WA of the rear portion is, and this may cause inconvenience in which the driving support control is delayed.

According to the present embodiment, the ECU 10 is configured to acquire a tip end lateral position in the vehicle width direction, which is the closest position to the own vehicle 50 among the lateral positions of the other vehicle 60. Specifically, the ECU 10 determines whether portions other than the front end portion of the object (other vehicle 60) has been acquired by the radar apparatus 21 or the imaging device 22.

For example, in the case where the image pattern of the imaging device 22 and the pattern of the rear portion are matched, the ECU 10 determines that portions other than the front end portion have been acquired. Also, when a travelling angle formed between the travelling direction of the object (other vehicle 60) acquired by the radar apparatus 21 and the travelling direction of the own vehicle 50 is a predetermined value or more, the ECU 10 determines that portions other than the front end portion have been acquired. Thus, the ECU 10 functions as a portion determination unit.

Figure 4:
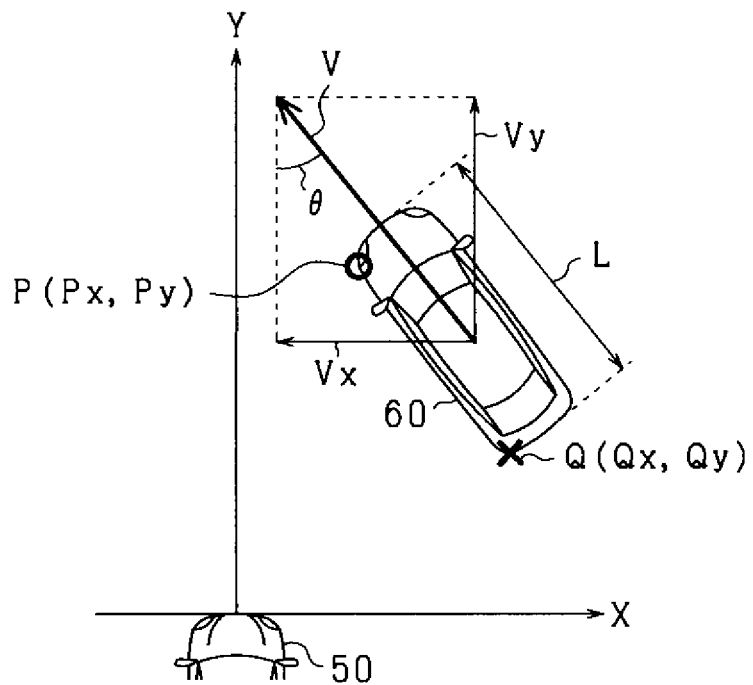
FIG. 4 is a diagram showing a lateral position of a front end portion of the other vehicle.

The ECU 10 estimates, based on the lateral position of portions other than the acquired front end potion, the front end lateral position Px which is a tip end lateral position of the object, when the ECU determines that portions other than the front end portion of the object (other vehicle 60) have been detected. As shown in FIG. 4, the front end lateral position Px corresponds to a lateral position of the front end portion (either left or right side of the object relative to a direction inclined to the travelling direction of the own vehicle 50) of the other vehicle with respect to the vehicle width direction of the own vehicle 50.

More specifically, firstly, the ECU 10 calculates the travelling angle θ of the other vehicle 60 relative of the travelling direction of the own vehicle, based on the velocity vector. The travelling angle θ indicates θ° when the velocity vector θ of the other vehicle 60 extends in the same direction (i.e., in parallel) as the travelling direction of the own vehicle 50, and the travelling angle θ indicates larger angle as the other vehicle 60 is oriented towards lateral direction with respect to the own vehicle 50.

Thereafter, the ECU 10 calculates, in accordance with the following equation (1), the front end lateral position Px of the other vehicle 60 as the calculated tip end lateral position, based on the calculated travelling angle θ of the other vehicle 60, the acquired lateral position Qx and the vehicle length L of the other vehicle L.

$$\text{Front end lateral position } Px = \text{sensor-detected lateral position } Qx + \text{vehicle length } L \times \sin\theta \quad (1)$$

Here, the front end lateral position Px and the sensor-detected lateral position Qx are values in the vehicle width direction (X-axis component) of the relative coordinate. In other words, in FIG. 4, the sensor-detected lateral position Qx corresponds to a lateral position of the representative point Q, and the front end lateral position Px corresponds to the lateral position P of the front end lateral position Px. Also, the vehicle length L of the other vehicle 60 refers to length information of the vehicle in the front-rear direction (velocity vector direction) of the other vehicle 60. For example, a predetermined value (e.g., 4 meter) is set to the vehicle length.

According to a configuration shown in FIG. 4, the front end lateral position Px which is a tip end lateral position of the other vehicle 60 is estimated using a detection result of the radar apparatus 21. However, the front end lateral position Px can be estimated as well by using the lateral width WA of the rear portion of the other vehicle 60 which is detected in accordance with the captured image of the imaging device 22. In other words, a predetermined lateral position (e.g., left end lateral position) of the lateral width WA is applied to the above equation (1), whereby the front end lateral position Px is calculated. As described above, the ECU 10 serves as an estimation unit.

On the other hand, when determined that no portions other than the front end portion of the object (other vehicle 60) have been acquired, the ECU 10 determines a lateral position which is the closest to the own vehicle 50 to be a tip end lateral position, among a lateral position detected by the radar apparatus 21 and a lateral position based on the lateral width WA of the object identified by a pattern matching of the captured image by the imaging device 22. That is, when detecting the lateral position of the front end portion of the other vehicle 60, or the traveling direction of the other vehicle 60 is close to a parallel relationship with that of the own vehicle 50 so that there is no difference between the lateral position of the front end portion and the lateral position of the rear end portion, the ECU 10 identifies the tip end lateral position based on the detected lateral position and acquires the identified tip end lateral position.

Also, the ECU 10 includes a function performed by an object determination unit 12 that determines whether the other vehicle is an object for driving support control. Specifically, the ECU 10 as the object determination unit 12 determines, when the tip end lateral position of the other vehicle 60 acquired by the acquiring unit 11 moves inside the present lane S1 from the adjacent lane, that it is a situation where the other vehicle 60 moves between lanes (i.e., cutting in) towards the present lane S1 so that the other vehicle is an object (i.e., preceding vehicle) for a driving support control.

Even in a case where the other vehicle 60 is in an adjacent lane, the process may determine the other vehicle 60 will move in the present lane S1. specifically, even when the travelling direction of the other vehicle 60 changes, increasing an acceleration factor in a direction where the other vehicle leaves the present lane S1, there is a steering angle and the acceleration of the vehicle are limited. Accordingly, an amount of lateral movement of the other vehicle 60 can be estimated.

According to the present embodiment, the ECU 10 calculates, based on the travelling direction and speed of the other vehicle 60 in the adjacent lane, an amount of lateral movement of the other vehicle 60 in a direction perpendicular to the present lane S1. Then the ECU 10 determines, based on the amount of the lateral movement, whether the tip end lateral position will move into the present lane S1 from the adjacent lane.

Figure 5A:
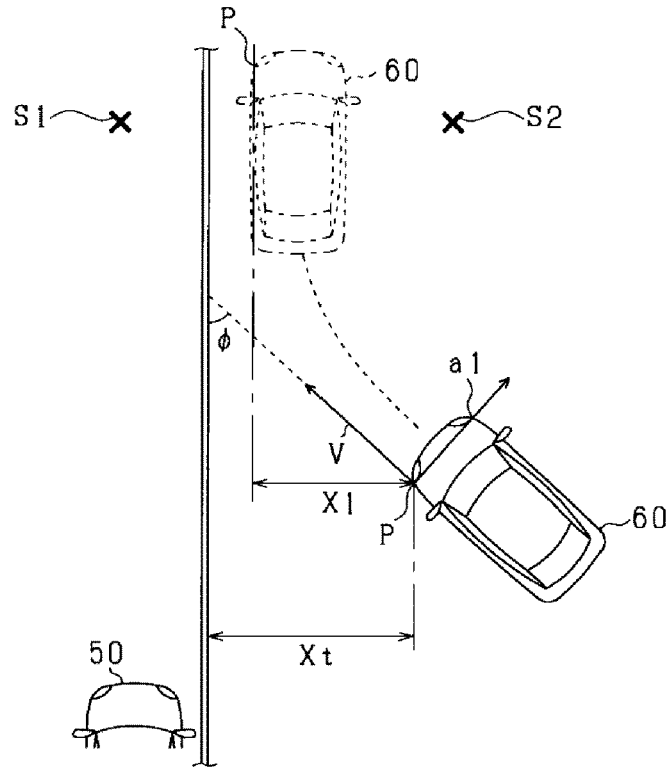
FIGS. 5A and 5B are diagrams each showing an amount of lateral movement of the other vehicle.
Figure 5B:
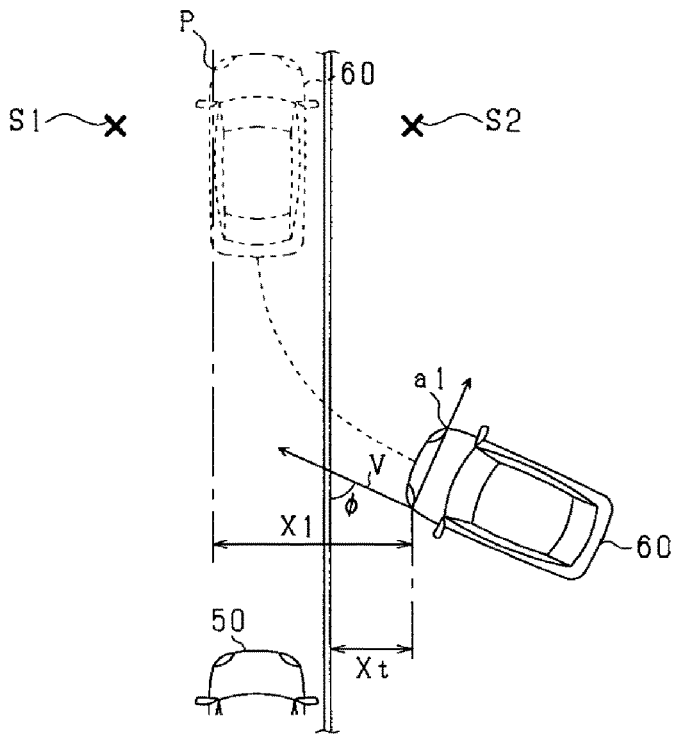

With reference to FIGS. 5A and 5B, estimation of an amount of lateral movement x1 (calculation) will be described. According to the present embodiment, the ECU 10 calculates an amount of lateral movement x1 in a case where an acceleration of the other vehicle 60 occurs in a direction away from the present lane S1. More specifically, as shown in FIGS. 5A and 5B, the amount of lateral movement x1 is calculated assuming a case where a predetermined acceleration factor a1 occurs in a direction perpendicular to the travelling direction of the other vehicle 60 and a direction away from the present lane S1.

As a predetermined acceleration factor a1, an arbitrary value is stored in advance. However, the predetermined acceleration a1 may preferably be a value close to the maximum value within possible acceleration factors of the other vehicle 60. Also, appropriate value is decided for the predetermined acceleration a1 based on a result of experiment or the like. The maximum value of the acceleration factor refers to a value when the steering angle of the other vehicle 60 becomes maximum in a direction away from the present lane S1, for example.

Then, the ECU 10 estimates an amount of the lateral movement x1 (calculation) based on the following equation (2). Note that V indicates to a travelling speed of the other vehicle 60, and φ indicates an entry angle at which the other vehicle 60 enters the present lane. Note that the entry angle φ and the travelling angle θ is approximately the same so that the travelling angle θ may be used instead of using the entry angle φ.

$$x1 = (V^2/a1) \cdot (1 - \cos\varphi) \quad (2)$$

As shown in FIG. 5B, the ECU 10 determines that the tip end lateral position of the other vehicle 60 moves (enters) into the present lane S1 when the calculated amount of the lateral movement x1 is larger than a distance Xt between the present lane S1 and the tip end lateral position. In this case, the ECU 10 determines that the other vehicle 60 moves in the present lane S1 as a movement between lanes and the other vehicle 60 is an object (preceding vehicle) of a driving support control.

On the other hand, as shown in FIG. 5A, the ECU 10 determines that the tip end lateral position of the other vehicle 60 will not move in the present lane S1 when the calculated amount of lateral movement x1 is less than or equal to the distance Xt between the present lane S1 to the tip end lateral position. In this case, the ECU 10 determines a state where the other vehicle 60 will not move in the present lane S1 as a movement between lanes, and determines that the other vehicle 60 is not an object (i.e., preceding vehicle) for the driving support control.

Also, as shown in FIG. 1, the ECU 10 includes a function executed by an other vehicle determination unit 13 that determines a state where the other vehicle 60 moves towards the present lane S1 (i.e., travelling road on which the own vehicle 50 runs). According to the present embodiment, the ECU 10 determines a state where the other vehicle 60 will move towards the present lane S1, when determining that other vehicle is present in an adjacent lane and estimating that the other vehicle 60 will collide with the own vehicle 50.

Further, the ECU 10 includes a function executed by a support control unit 14 that performs a driving support control, for example. Specifically, the ECU 10 as the support control unit 14, when determining that the other vehicle 60 moves between lanes, performs a braking control with an object of the other vehicle 60. Meanwhile, the ECU 10 restricts the braking control relative to the other vehicle 60, when determining that the other vehicle 60 does not move between lanes.

Figure 6:
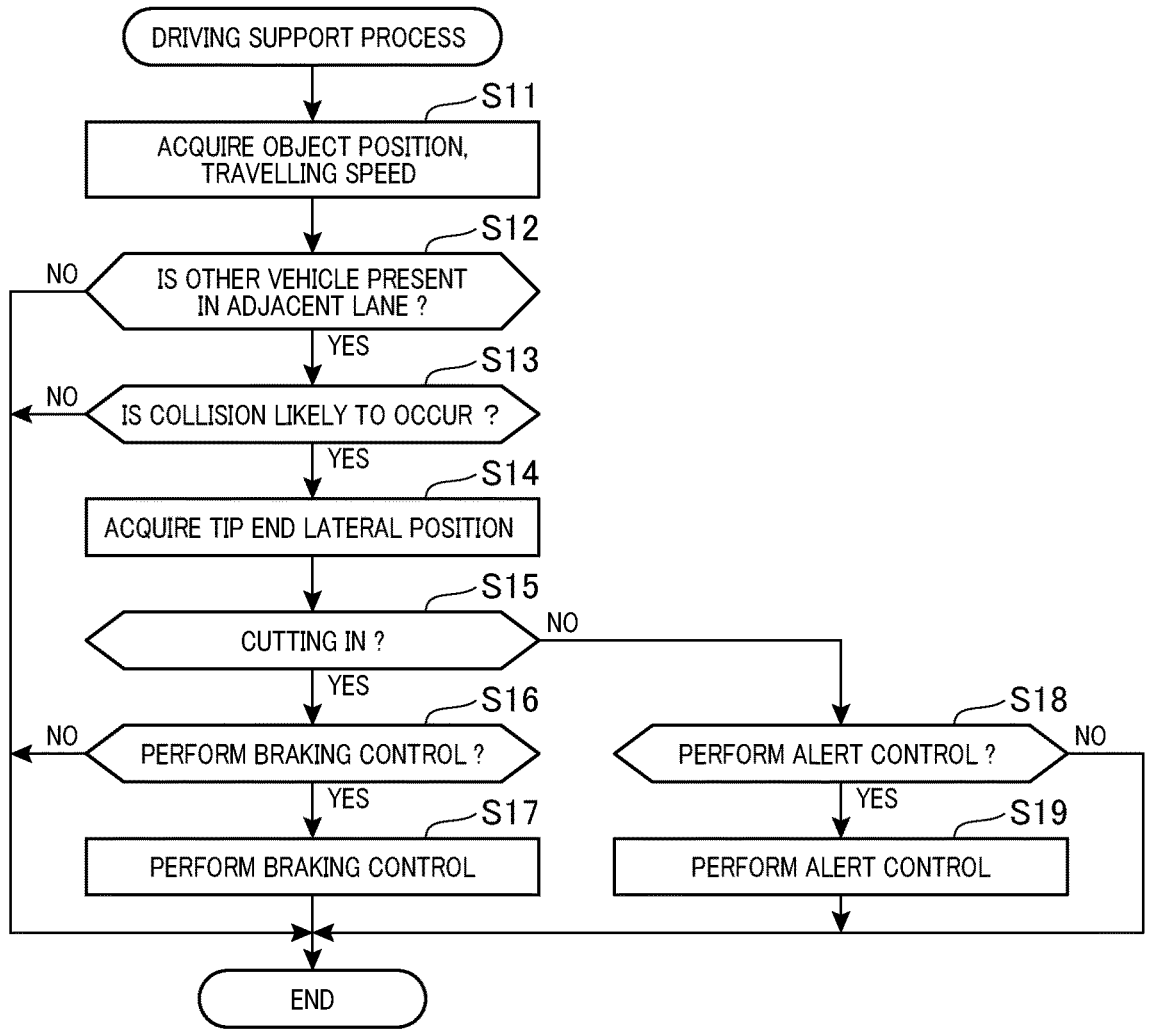
FIG. 6 is a flowchart showing a driving support process.

With reference to a flowchart in FIG. 6, a driving support process executed by the ECU 10 will be described. This process is repeatedly executed at a predetermined period.

First, at step S11, the ECU 10 receives object information outputted by the radar apparatus 21 and the captured image outputted by the imaging device 22, and acquires a travelling direction of the object, a lateral position, a distance (relative distance) and a travelling speed.

At step S12, the ECU 10 determines, based on the received captured image, whether the other vehicle 60 is present in an area ahead of the own vehicle 50 and within the adjacent lane. Specifically, at step S12, the ECU 10 determines whether the other vehicle 60 is present by using a pattern matching technique with dictionary information of rear pattern of the own vehicle.

Moreover, the ECU 10 determines whether the other vehicle 60 is present in the adjacent lane or not, based on the lateral position of an acquired object (i.e., other vehicle 60), when determining that other vehicle 60 is present.

Specifically, the ECU 10 defines a boundary of right/left sides of the own vehicle S1, based on the markings at both sides (left and right sides) of the own vehicle 50. Note that the marking may be identified by a known method based on the captured image outputted by the imaging device 22, for example. The ECU 10 determines whether the other vehicle 60 is present outside the present lane S1 (i.e., in an adjacent lane) in a direction that intersects the identified present lane S1. At this moment, for example, when at least a part of the lateral position (lateral width) of the other vehicle 60 is present within the adjacent lane, the ECU 10 determines that the other vehicle 60 is present in the adjacent lane.

According to the present embodiment, when the other vehicle 60 is present outside the present lane S1, the ECU determines that the other vehicle 60 is present in the adjacent lane. However, the process may identify all of markings and identify adjacent lanes based on the marking lines.

If determination result at step S12 is negative, the process is terminated. When the determination result is affirmative at step S12, the process proceeds to step S13.

Next, the ECU 10 determines, based on whether the vehicle 60 is present in a collision estimated region, whether a state is present in which the other vehicle moves towards the present lane S1 and may collide with the own vehicle (step S13). Specifically, the ECU 10 sets a collision estimated region based on the lateral speed Vx of the other vehicle 60. At step S13, the ECU 10 determines whether the lateral position of the other vehicle 60 is present (overlapped) within the set collision estimated region. Note that the ECU 10 may estimate a tip end lateral position and determine whether the estimated tip end lateral position is within the collision estimated region.

When the determination result at step S13 is negative, since the other vehicle 60 and the own vehicle 50 will not collide with each other (it is not a case where the other vehicle 60 will not move into the present lane S1), the process terminates the procedure. When the determination result at step S13 is affirmative, the process proceeds to step S14.

Next, the ECU 10 acquires a tip end lateral position (step S14). As described above, when it is determined that lateral positions other than that of the front end portion of the other vehicle 560 have been acquired, the ECU 10 estimates the front end lateral position Px of the other vehicle 60, based on the travelling direction of the other vehicle 60 and portions other than the front end portion, and acquires the estimated front end lateral position Px as the tip end lateral position. Moreover, when it is determined that no lateral position of a portion other than the front end potion of the other vehicle 60 is detected, the ECU identifies the tip end lateral position of the other vehicle 60 which is the most close to the own vehicle 50, based on the detected object information and the captured image, and acquires the identified tip end lateral position.

Next, the ECU 10 determines, based on the movement (or predicted movement) of the tip end lateral position into the present lane S1 from the adjacent lane, whether the other vehicle 60 moves into the present lane S1 as a movement between lanes (step S15). In step S15, the ECU 10 determines, when the tip end lateral position acquired at step S14 moves into the present lane S1 from the adjacent lane, a state where the other vehicle 60 moves into the present lane S1. Also, at step S15, as described above, the ECU 10 estimates an amount of lateral movement x1 of the other vehicle 60, and determines a state where the other vehicle 60 moves into the present lane S1 as a movement between lanes, even when the lateral movement amount x1 is larger than a distance between the tip end lateral position of the other vehicle 60 and the present lane S1. When the ECU 10 determines that the other vehicle 60 moves into the present lane S1 from an adjacent lane, the ECU 10 sets the other vehicle 60 to be an object for running control. In the case where it is determined that a lateral position of a portion other than the front end portion of the other vehicle 60 has been acquired at step S14, the ECU 10 determines, at step S15, that the front end position Px of the estimated other vehicle 60 to be a tip end lateral position.

When the determination result at step S15 is affirmative, the process proceeds to step S16, and when the determination result at step S15 is negative, the process proceeds to step S18.

When the determination result at step S15 is affirmative, the ECU 10 determines whether a braking control as a driving support control is activated (step S16). For example, when the collision prediction time between the other vehicle 60 existing in a predicted collision region and the own vehicle 50 is shorter than a first period T1, the ECU 10 determines activation of the braking control as the driving support control. When the determination result at step S16 is negative, and terminates the procedure. When the determination result at step S16 is affirmative, the process proceeds to step S17. Then, the ECU 10 performs the braking control as a driving support control, and transmits an activation command to the braking apparatus 32 (step S17). The ECU 10 immediately stops the process of step S17 being executed if the other vehicle goes out from the predicted collision region while the ECU 10 is transmitting the activation command to the braking apparatus 32, and terminates the procedure.

On the other hand, if the determination result at step S15 is negative, the ECU 10 determines whether an alert control is performed or not (step S18). For example, the ECU 10 determines an activation of an alert process when the collision prediction time between the other vehicle 60 existing in the predicted collision region and the own vehicle 50 is shorter than a second period T2. According to the present embodiment, the second period T2 is linger than the first period T1.

When the determination result at step S18 is negative, the ECU 10 terminates the procedure. When the determination result at step S18 is affirmative, the process proceeds to step S19. Then, the ECU 10 activates an alert control and transmits an activate command to the alert device 31 (step S19). The ECU 10 immediately stops the process of step S19 being executed if the other vehicle goes out from the predicted collision region while the ECU 10 is transmitting the activation command to the alert device 31, and terminates the procedure.

According to the above detailed description, the following advantageous effects can be obtained.

In the case where the other vehicle 60 approaches the present lane S1 from an adjacent lane, but the other vehicle 60 does not cut in the present lane S1 (movement between lanes) and stays in the adjacent lane, the tip end lateral position of the other vehicle 60 does not move in the present lane S1. Accordingly, the ECU 10 is configured to determine a state where the other vehicle 60 is moving in the present lane S1 as a movement between lanes, based on the movement or a predicted movement of the tip end lateral position into the present lane S1 from the adjacent lane. Then, when it is determined that the other vehicle 60 will not move between lanes, the ECU 10 recognizes that the other vehicle 60 is not an object of the braking control as a driving support control. Thus, even in the case where the other vehicle 60 approaches the present lane S1 from an adjacent lane, the other vehicle 60, but stays in the adjacent lane without cutting into the present lane S1, unnecessary driving support control (braking control) can be suppressed.

When the other vehicle 60 moves between lanes (cutting in), normally, the front end portion of the other vehicle 60 enters the present lane in the earliest than other portions. However, depending on characteristics of the radar apparatus 21 and the imaging device 22 or a shape and a state of the other vehicle 60, the front end portion of the other vehicle 60 is unlikely to be acquired so that portion other than the front end portion may be acquired. Even in this case, the ECU 10 estimates the front end lateral position Px which is a tip end lateral position based on the travelling direction of the other vehicle 60 and the vehicle length L, and acquires the estimated front end lateral position Px to be the tip end lateral position. Then, the ECU 10 determines a state of movement between lines (cutting in) based on the tip end lateral position. Hence, the ECU 10 is able to appropriately determine a state of movement between lines. Also, cutting in can be determined earlier than a case where cutting in is determined based on a lateral position of a portion other than the front end portion.

The ECU 10 estimates an amount of lateral movement x1 of the other vehicle 60 based on the travelling direction and the speed of the other vehicle 60 in the adjacent lane, and determines that the tip end lateral position is about to move to the present lane S1 from the adjacent lane based on the lateral movement x1. In other words, even in the case where the other vehicle 60 is in the adjacent lane, when determining that it is impossible to stay in the adjacent lane based on a travelling direction or the like, the ECU 80 determines a state where the other vehicle 60 moves to the present lane S1 as a movement between lanes. Accordingly, a cutting in event can be appropriately determined and unnecessary driving support can be reduced.

The ECU 10 calculates an amount of lateral movement x1 when the travelling direction of the other vehicle 60 changes to a direction away from the present lane S1, that is, an acceleration factor of the other vehicle 60 is generated in a direction away from the own vehicle S1. Therefore, the ECU 10 is able to appropriately determine whether the other vehicle moves between lanes or not, even when the other vehicle 60 stops movement between lanes (cutting in) so that an acceleration factor of the other vehicle 60 increases in a direction away from the present lane S1. Accordingly, unnecessary driving support control (automatic brake) can be suppressed.

The ECU 10 performs a driving support when the other vehicle 60 is determined to move between lanes and when it is determined that the other vehicle 60 and the own vehicle 50 are predicted to collide to each other. Hence, even when the other vehicle 60 move into the present lane S1, if a collision is not predicted, the other vehicle is not regarded as an object for driving support control of the own vehicle. Therefore, unnecessary driving support control can be suppressed.

The ECU 10 performs an alert process when a collision is predicted but a state is determined that the other vehicle 60 will not move between lanes. On the other hand, the ECU 10 performs a braking control instead of the alert control when a collision is predicted and a state where the other vehicle 60 moves into the present lane S1 as a movement between lanes. Thus, depending on such situations an alert process and a braking control are performed, thereby notifying the driver of situation surrounding the own vehicle. Also, depending on various situations, appropriate types of driving support can be performed.

Other Embodiment

The present disclosure is not limited to the above-described. For example, embodiments can be modified as follows. Hereinafter, the same reference numbers are applied to mutually identical or equivalent portions through embodiment and the same explanation will be applied.

In the above-described embodiments, the ECU 10 may perform a driving support control (PCS) using a seatbelt apparatus. The seatbelt apparatus is composed of a seatbelt provided in each seat of the own vehicle 50 and a pretensioner that withdraws the seatbelt. The seat belt apparatus performs, as a PCS operation, a preliminary action of a tensioning of the seatbelt when the probability of collision between the own vehicle 50 and the other vehicle 60 becomes high. When it is determined that collision cannot be avoided, the seatbelt apparatus is controlled such that the seatbelt is tightened (i.e., to eliminate slack) to fix the passenger onto the seat to protect the passenger.

According to the above-described embodiments, the present lane S1 where the own vehicle 50 runs is determined by a marking. However, the present lane (running road) can be determined by other methods. For example, the ECU 10 may determine a boundary of right/left sides of the running road using a width of the own vehicle 50 or a predetermined width with respect to the center of the own vehicle in the width direction thereof. The predetermined width can be changed arbitrarily. For example, a width related to a possible collision (e.g., double the width of the own vehicle 50) may be set as a predetermined width. Also, the predetermined width may be changed depending on the travelling speed of the own vehicle 50 and the travelling speed of the other vehicle 60.

The other vehicle 60 is not limited to a four-wheel vehicle but may be a two-wheel vehicles or bicycle.

According to the above-described embodiments, when a plurality of other vehicles 60 are detected, the driving support process may be executed for each vehicle, or may be performed for the closest other vehicle 60 as an object.

According to the above-described embodiments, it is determined whether a probability of collision between the own vehicle 50 and other vehicle 60 is high. However, other methods can be employed to determine probability of collision. For example, the process may identify, based on a steering angle or a travelling speed of the own vehicle 50, an estimated travelling path of the own vehicle 50, and identify an estimated travelling path of the other vehicle 60 based on information (location and travelling speed) about the other vehicle 60, and may determine the probability of collision with a determination whether the estimated travelling paths intercept or not.

According to the above-described embodiments, the radar apparatus 21 and the imaging device 22 detect other vehicle 60. However, other vehicle 60 may be detected by other apparatuses. For example, other vehicle 60 and the own vehicle 50 are configured to be communicable to each other such that the other vehicle 60 is detected based on received information from the other vehicle 60. Also, a laser sensor may be employed as a vehicle detection apparatus. Moreover, either the radar apparatus 21 or the imaging device 22 may be used.

According to the above-described embodiments, the ECU 10 calculates a travelling direction of the other vehicle 60 based on object information of the radar apparatus 21 and captured images from the imaging device 22. However, the travelling direction of the other vehicle 60 may be calculated by the radar apparatus 21 or the imaging device 22, and the calculated result may be transmitted to the ECU 10.

In the present embodiment, any method can be used to estimate (calculate) the lateral movement x1 based on the entry angle φ and the travelling speed V. For example, a lateral speed may be calculated by using the entry angle φ and the travelling speed V. For example, a lateral speed is calculated based on the entry angle φ and the travelling speed V, and add a predetermined time (e.g., 0.5 second to 2 second) to the lateral speed, thereby calculating an amount of lateral movement.

In the above-described embodiments, the representative point Q among the points detected by the radar apparatus 21 may be a point selected from a plurality of detection points (e.g., point having a larger reflection intensity, a left end point, a right end point, an intermediate point among the plurality of detection points), or a mid point between the left end point and the right end point).

According to the above-described embodiments, the ECU 10 may perform a braking control in addition to the alert control, when a collision is predicted and the other vehicle 60 moves into the present lane S1 as a movement between lanes. In other words, the content of the driving support control may be changed to any content. For example, the driving support control may include an alert control.

In the above-described embodiments, a method of setting the predicted collision region can be arbitrarily changed. For example, a probability of collision may be predicted based on a determination whether a lateral position of an object and a collision prediction time are within the collision prediction region or not, where the lateral position of an object is set to a horizontal axis (X-axis), and the collision prediction time is set to a vertical axis (Y-axis)

The predicted collision region may be adjusted based on a lateral speed of an object or a collision prediction time. For example, the adjustment can be made such that a right boundary line of the predicted collision region may be a linear line expressed by the following equation (3), and a left boundary line of the predicted collision region may be a linear line expressed by the following equation (4). Note that Xr refers to a right end of the front end portion of the own vehicle 50, and X1 refers to a left end of the front end portion of the own vehicle 50. Also, Xr (t) refers to a lateral position of the right boundary line of the predicted collision region at time t, X1 (t) refers to a lateral portion of a left boundary line of the predicted collision region at time t. Further, Vx (t) refers to a lateral speed of an object at time t, TTC refers to a collision prediction time. A direction of the lateral speed Vx (t) is defined such that the right direction is positive direction. The upper limit of the collision prediction time TTC (t) refers to second time T2.

$$Xr(t) = Xr - Vx(t) \times TTC \quad (3)$$

$$X1(t) = X1 - Vx(t) \times TTC \quad (4)$$

Figure 7:
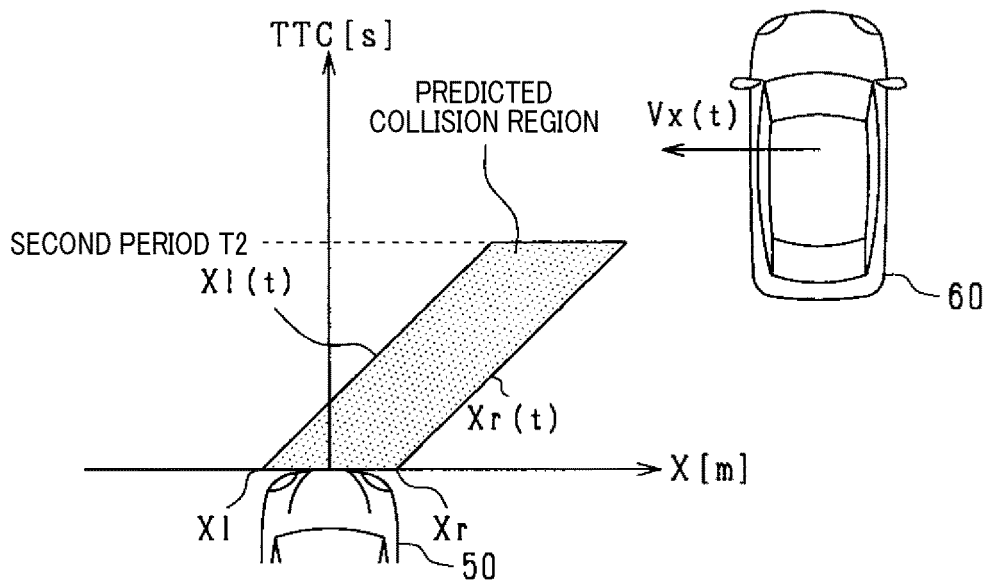
FIG. 7 is a diagram showing a predicted collision region in another example.

FIG. 7 shows a predicted collision region after adjustment. Note that the predicted collision region in FIG. 7 is defined assuming a case where an object moves in the left direction (a direction approaching the own vehicle 50). The collision prediction time is added to the lateral speed of the object, thereby calculating an amount of a lateral movement of the object within the collision prediction time. The collision prediction time is adjusted considering an amount of lateral movement of an object within the collision predicted time, whereby erroneous predictions can be suppressed, the erroneous prediction including a case where an other vehicle 60 entering the present lane after the own vehicle 50 passed though is predicted as an object, or a case where an other vehicle 60 intercepting the own vehicle 50 is predicted to collide with the own vehicle 50.

In the above-described embodiments, a width of the predicted collision region is not limited to the width of the own vehicle 50. However, the width of the predicted collision region can be larger than that of the own vehicle 50. For example, the width of the predicted collision region may be changed depending on travelling speed of the own vehicle 50 or other vehicle 60.

In the above-described embodiments, the ECU 10 may recognize a shape of the other vehicle 60 based on the detection information to estimate the tip end lateral position. For example, the ECU 10 identifies types of vehicle such as a two-wheel vehicle, a standard vehicle, a bicycle and a truck, based on the rear pattern of the vehicle. Then, the ECU 10 estimates a vehicle length L based on the types of vehicle and may estimate a tip end vertical position based on the estimated vehicle length L and the lateral position of the other vehicle 60.

In the above-described embodiments, when the determination result at step S14 is negative, the ECU 10 may terminate the driving support process without performing the alert process. In other words, an execution of the alert control may be restricted.

In the above-described embodiments, in the case where the ECU 10 determines that other vehicle 60 is present in an adjacent lane and a predicts a collision between the own vehicle and the other vehicle 60, the ECU 10 determines that the other vehicle 60 moves towards the present lane S1. Alternatively, in the case where the other vehicle 60 is present in the adjacent lane and the other vehicle 60 approaches towards a side of the own vehicle 50, the ECU may determine a state where the other vehicle 60 is moving towards the present lane S1. Also, when determining that a collision may occur, the ECU 10 may determine a state where the other vehicle 60 is moving towards the present lane S1.

What is claimed is:

1. A driving support apparatus for performing driving support control of an own vehicle in a present lane with respect to a preceding vehicle running ahead of the own vehicle, the own vehicle equipped with an object detection device configured to detect an object in a surroundings an own vehicle, the driving support apparatus comprising:
   an other vehicle determination unit configured to determine whether an other vehicle in an adjacent lane is moving towards the present lane, the adjacent lane located adjacent to the present lane within which the own vehicle runs;
   an acquiring unit configured to acquire, based on detection information of the object from the object detection device, a tip end lateral position of the other vehicle, the acquiring unit acquiring the tip end lateral position among lateral positions of the other vehicle in a direction perpendicular to a travelling direction of the own vehicle; and
   an object determination unit configured to, in a state in which the other vehicle determination unit determines that the other vehicle is moving towards the present lane,
      determine the other vehicle to be an object for performing driving support control based on a movement or a predicted movement of the tip end lateral position into the present lane from the adjacent lane, and
      determine the other vehicle to not be an object for performing driving support control based on a lack of movement of the tip end lateral position into the present lane, wherein
   the object determination unit is configured to calculate, based on a travelling direction and a travelling speed of the other vehicle existing in the adjacent lane, an amount of lateral movement of the other vehicle in a direction perpendicular to the present lane, and determines, based on the amount of lateral movement, whether the tip end lateral position will move into the present lane from the adjacent lane, and
   the object determination unit is configured to calculate the amount of lateral movement based on an acceleration value of the other vehicle in a direction away from the own vehicle.

2. The driving support apparatus according to claim 1, wherein
   the driving support apparatus includes:
      a portion determination unit configured to determine whether the tip end lateral position of the other vehicle acquired by the acquiring unit is a lateral position of a portion of the other vehicle other than a front end portion of the other vehicle; and
      an estimation unit configured to estimate, in response to the portion determination unit determining that the tip end lateral position the of the other vehicle is the lateral position of a portion other than a front end portion of the other vehicle, a new tip end lateral position of the other vehicle, based on a travelling direction of the other vehicle, a lateral position of the other vehicle, and length information in a front-rear direction of the other vehicle.

3. The driving support apparatus according to claim 1, wherein
   the object determination unit is configured to calculate the amount of lateral movement in response to the travelling direction of the other vehicle changing to a direction away from the present lane.

4. The driving support apparatus according to claim 1, wherein
   the driving support apparatus includes a support control unit, and
   in response to the other vehicle determination unit determining that the other vehicle is moving towards the present lane, the support control unit is configured to perform a braking control that brakes a vehicle based on a movement or a predicted movement of the tip end lateral position into the present lane from the adjacent lane, and is configured to perform an alert control that attracts a driver's attention based on a lack of movement the tip end lateral position into the present lane.

5. The driving support apparatus according to claim 1, wherein
   the acceleration value is a value in which the acceleration value occurs at a time in which a steering angle of the other vehicle is at a maximum in a direction away from the present lane.

6. A method for performing driving support control of an own vehicle in a present lane with respect to a preceding vehicle running ahead of the own vehicle, the own vehicle equipped with an object detection device configured to detect an object in a surroundings an own vehicle, the method comprising:
   determining whether an other vehicle in an adjacent lane is moving towards the present lane, the adjacent lane located adjacent to the present lane within which the own vehicle runs;
   acquiring, based on detection information of the object from the object detection device, a tip end lateral position of the other vehicle, the tip end lateral position being acquired among lateral positions of the other vehicle in a direction perpendicular to a travelling direction of the own vehicle; and
   determine, in a state in which the other vehicle is determined to be moving towards the present lane, that the other vehicle is an object for performing driving support control based on a movement or a predicted movement of the tip end lateral position into the present lane from the adjacent lane; and
   determine that the other vehicle is not be an object for performing driving support control based on a lack of movement of the tip end lateral position into the present lane,
   wherein
   an amount of lateral movement of the other vehicle in a direction perpendicular to the present lane is calculated based on a travelling direction and a travelling speed of the other vehicle existing in the adjacent lane, and whether the tip end lateral position will move into the present lane from the adjacent lane is determined based on the amount of lateral movement, and
   the amount of lateral movement is calculated based on an acceleration value of the other vehicle in a direction away from the own vehicle.

* * * * *